United States Patent [19]

Nirdosh et al.

[11] 4,454,097
[45] Jun. 12, 1984

[54] PROCESS OF EXTRACTING BOTH URANIUM AND RADIUM FROM URANIUM-CONTAINING ORES

[76] Inventors: Inderjit Nirdosh, 494 Ryerson Crescent, Thunder Bay, Ontario, Canada, P7C 5R8; Malcolm H. Baird, 139 Old Ancaster Rd., Dundas, Ontario, Canada, L9H 3R3; Sanjoy Banerjee, 891 Jimeno Rd., Santa Barbara, Calif. 93103; Sirugamani V. Muthuswami, 111 Clydesdale Dr., Willowdale, Ontario, Canada, M2J 3N3

[21] Appl. No.: 435,858

[22] Filed: Oct. 21, 1982

[51] Int. Cl.³ .................. C01G 43/00; C01F 13/00
[52] U.S. Cl. ............................. 423/8; 423/2; 423/10; 423/20; 423/3
[58] Field of Search ............ 423/2, 3, 6, 8, 10, 423/18, 20

[56] References Cited

U.S. PATENT DOCUMENTS

| | | | |
|---|---|---|---|
| 1,142,153 | 6/1915 | Ebler | 423/2 |
| 1,435,180 | 11/1922 | Schlesinger | 423/2 |
| 1,522,040 | 1/1925 | Thews et al. | 423/2 |
| 2,859,094 | 11/1958 | Schmitt et al. | 423/20 X |
| 2,894,804 | 7/1959 | Sawyer et al. | 423/2 |
| 4,206,182 | 6/1980 | Lafforgue et al. | 423/3 X |

OTHER PUBLICATIONS

Baird et al., "Reduction of Radionuclide Levels in Uranium Mine Tailings"; in Proceedings of NEA Workshops at Colorado State University, Fort Collins, USA, Oct. 28–30, 1981: *Uranium Mill Tailings Management.*

*Primary Examiner*—B. R. Padgett
*Assistant Examiner*—Matthew A. Thexton
*Attorney, Agent, or Firm*—Hirons, Rogers & Scott

[57] ABSTRACT

Ferric chloride leaching at temperatures in the range 47°–74° C. is found to remove up to 97% of the uranium from ores occurring in the Elliot Lake area of Canada, but radium removal was found to be poor due to the formation of sulphates from the sulphides present in the ore. In processes of the invention the sulphides are initially removed by flotation, when aqueous acidic ferric chloride of relatively low concentration, e.g. 0.1 M can extract as much as 92% of the radium, giving tailings which are effectively sulphide-free and with radium levels approaching a desired maximum of 24 pCi/g. Radium may be removed by adsorption on manganese dioxide and uranium may be removed by liquid extraction with D2EHPA (DAPEX process). The ferric chloride may be recirculated for further leaching, with reduction before the uranium extraction and reoxidation afterwards. Because of the recycle, it is possible to keep chloride ion levels in the effluent below the prescribed level in Ontario, Canada of 750 ppm.

10 Claims, 6 Drawing Figures

Dependence of uranium leaching on time, temperature and ferric chloride concentration.

Dependence of $^{226}$Ra leaching on time, temperature and ferric chloride concentration.

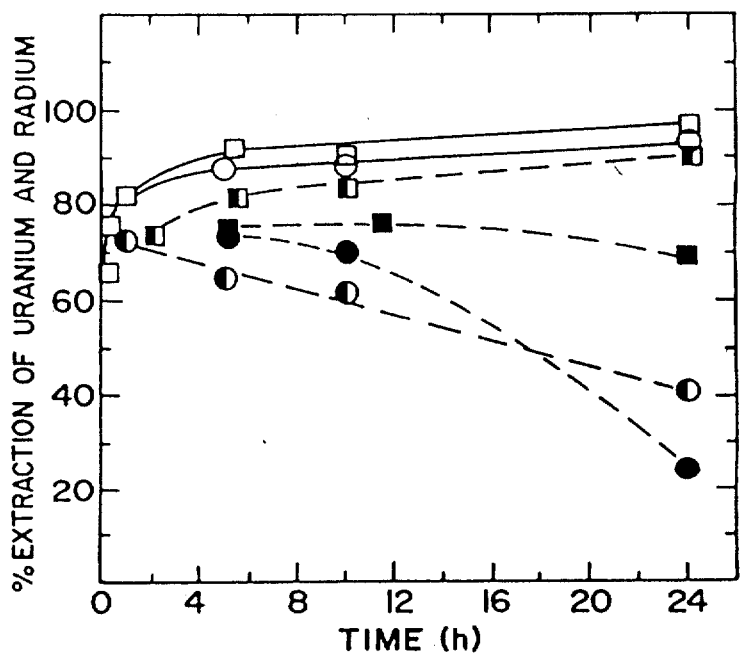

Effect of time of contact on the extraction of uranium and radium.

□ Uranium extraction from Pyrite Float Tails
◨ Radium extraction from Pyrit Float Tails
○ Uranium extraction from washed classifier overflow
◐ Radium extraction from washed classifier overflow Temperature = 47°C
■ Radium extraction from Pyrite Float Tails
● Radium extraction from classifier overflow

FIG. 4

Changes in e.m.f. during leaching of feed with 0.10 M $FeCl_3$ in 0.10 M HCl.

☐ Pyrite-Float-Tails
● Pyrite-Float-Concentrate
(Oxidant addition as indicated in the plots.)

Washed classifier overflow

× No oxidant added
△ $NaClO_3$ added initially (0.30 g/100 g feed)
▽ $NaClO_3$ added initially (0.60 g/100 g feed)
○ $NaClO_3$ added after 5.5 h (0.10 g/100 g feed)

Effect of Fe$^{3+}$ concentration on the extraction of uranium and radium from pyrite float tails

PROCESS OF EXTRACTING BOTH URANIUM AND RADIUM FROM URANIUM-CONTAINING ORES

FIELD OF THE INVENTION

The invention is concerned with improvements in or relating to processes for extracting both uranium and radium from uranium-containing ores.

REVIEW OF THE PRIOR ART

Uranium-containing ores always includes other radioactive constituents (radionuclides) such as thorium ($^{230}$Th) and radium ($^{226}$Ra) and it is radium that principally causes environmental concern, since it tends to concentrate in the bones of animals and humans. Because of the low concentration of uranium in most uranium-containing ores (typically 0.1%-1%) their processing involves grinding to a relatively fine state of division (typically 40 to 75 microns); the tailings resulting from the processing are correspondingly finely divided and contain the majority of the highly radioactive radionuclides. Because of their fine division the tailings may be leached by surface or ground waters as a result of which the radioactive materials may be able to enter the food consumption chain.

This has led to the development of tailings management techniques designed to minimize the spread of radionuclides into the environment either by water seepage or wind action in arid areas. These techniques include special liners (clay, plastics) for the tailings dams, surface covers for the areas such as asphalt or soils with vegetation, and special surface configurations designed to promote long-term stability and good drainage of rainwater clear of the tailings.

For the same reasons strict environmental standards have been set for various possible contaminants in water and foods, and for their levels in the effluents of processes. For example, in the Province of Ontario, Canada the maximum for radium in drinking water is 3 picocuries per liter (pCi/L), while a suggested acceptable maximum for such tailings is 25 pCi/g.

Radium usually occurs in secular radioactive equilibrium with its precursors and daughters in the radioactive decay series. Its equilibrium atomic concentration is in proportion to its half-life, so that an ore containing only 0.1% of $^{238}$U (half-life: $4.47 \times 10^9$ a) would contain an equilibrium concentration of 342 pCi/g of $^{226}$Ra. Uranium extraction by the conventional methods of sulphuric acid or alkaline leaching does not remove very much of this radium, which thus remains in the finely divided tailings in a more labile form than in the original orebody. This implies that over 90% of the radium must be removed to achieve the suggested maximum. Aqueous solutions of inorganic salts (mainly chlorides and nitrates) and inorganic acids, and organic chelating agents have been used for such removal, but the target level can only be reached with the use of prohibitively expensive quantities of reagents, due to the interference from other constituents of the tailings, e.g. calcium and other metals competing for chelating agents.

A number of processes for the extraction of uranium and/or radium have been proposed involving leaches with strong inorganic acids, but such processes pose operating difficulties because of the corrosiveness of the reagents and their relatively high expense.

Ferric chloride has been proposed hitherto in U.S. Pat. No. 2,894,804 of Sawyer and Handley, in the form of an aqueous solution thereof, as a leachant for the recovery of uranium and radium values from uranium ores, the preferred process operating at about 75° C. to 85° C. with a solution containing from 2 to 15 kilos of FeCl$_3$.6H$_2$O per kilo (0.03 to 0.45M) of uranium to be recovered. Preferably the process is operated at 85° C. and a concentration of 0.4M. The leachate may be treated to recover either uranium or radium first, or both together, and various sub-processes are proposed for this purpose. In one specific example with an ore assaying 3–4% uranium the leachate (filtrate) was found to contain 96.7% of the uranium and 89% of the radium present in the treated ore. The origins of the ores treated in this manner are not mentioned in the specification, but since both inventors apparently were residents of Denver, Colo., it seem logical to assume that they were from the Colorado plateau.

Attempts to use an aqueous ferric chloride leachant with other uranium ores have not been as successful in the matter of radium removal. The effectiveness of ferric ion as a leachant is well known for many minerals whose leaching involves an oxidation step. For example, it promotes the leaching of uranium by oxidation of the U(IV) form in the mineral to the more soluble U(VI) form:

$$UO_2 + 2Fe^{3+} \rightarrow UO_2^{2+} + 2Fe^{2+} \qquad (1)$$

It is understandable that the minimum condition for good radium removal from ores is good uranium removal, since the radium is a daughter of uranium and therefore occurs at the same positions in the mineral lattice. However, because of the different chemical properties of uranium and radium, such as the low solubilities of radium sulphate and carbonate, in contrast to those of uranyl sulphate and carbonate, a good leachant for uranium is not necessarily a good leachant for radium.

Another problem resulting from the use of ferric chloride is that environmental regulations set the maximum level of chloride ion in the effluent (irrigation waters) at 750 ppm, and this is difficult to achieve.

DEFINITION OF THE INVENTION

It is therefore the principal object of the invention to provide new processes for the extraction of both uranium and radium from uranium ores using an aqueous ferric chloride leachant.

In accordance with the present invention there is provided a process for the extraction of both uranium and radium from difficultly-leachable low grade uranium ores using an aqueous ferric chloride leachant in the presence of an interfering sulphate ion resulting from the presence of sulphide therein including the steps of:

(a) mechanically treating the finely ground ore for the removal of sulphide therefrom;

(b) leaching the mechanically treated finely ground ore with aqueous acidic ferric chloride solution in a concentration from 0.5M to 0.2M for the removal of uranium and radium therefrom to result in a liquid ferric chloride leachate containing radium and uranium and a wet cake containing retained ferric chloride with uranium and radium dissolved therein;

(c) treating the ferric chloride leachate to separate the uranium and radium therefrom;

(d) separately treating the wet cake for removal of retained ferric chloride and the dissolved uranium and radium therefrom; and (e) recirculating a major portion of the ferric chloride leachate from step (c) for the leaching of more of the mechanically treated finely ground ore.

In a process in which the interfering ion is sulphate formed from pyrite and pyrrhotite the mechanical treatment consists of flotation removal thereof.

DESCRIPTION OF THE DRAWINGS

Processes which are particular preferred embodiments of the invention will now be described, by way of example, with reference to the accompanying drawings, wherein:

FIG. 4 is a graph showing the effect of time of contact on the extraction of uranium and radium both for prior art processes and processes in accordance with the invention to permit comparison thereof.

DESCRIPTION OF THE PREFERRED EMBODIMENTS

Figure 1:
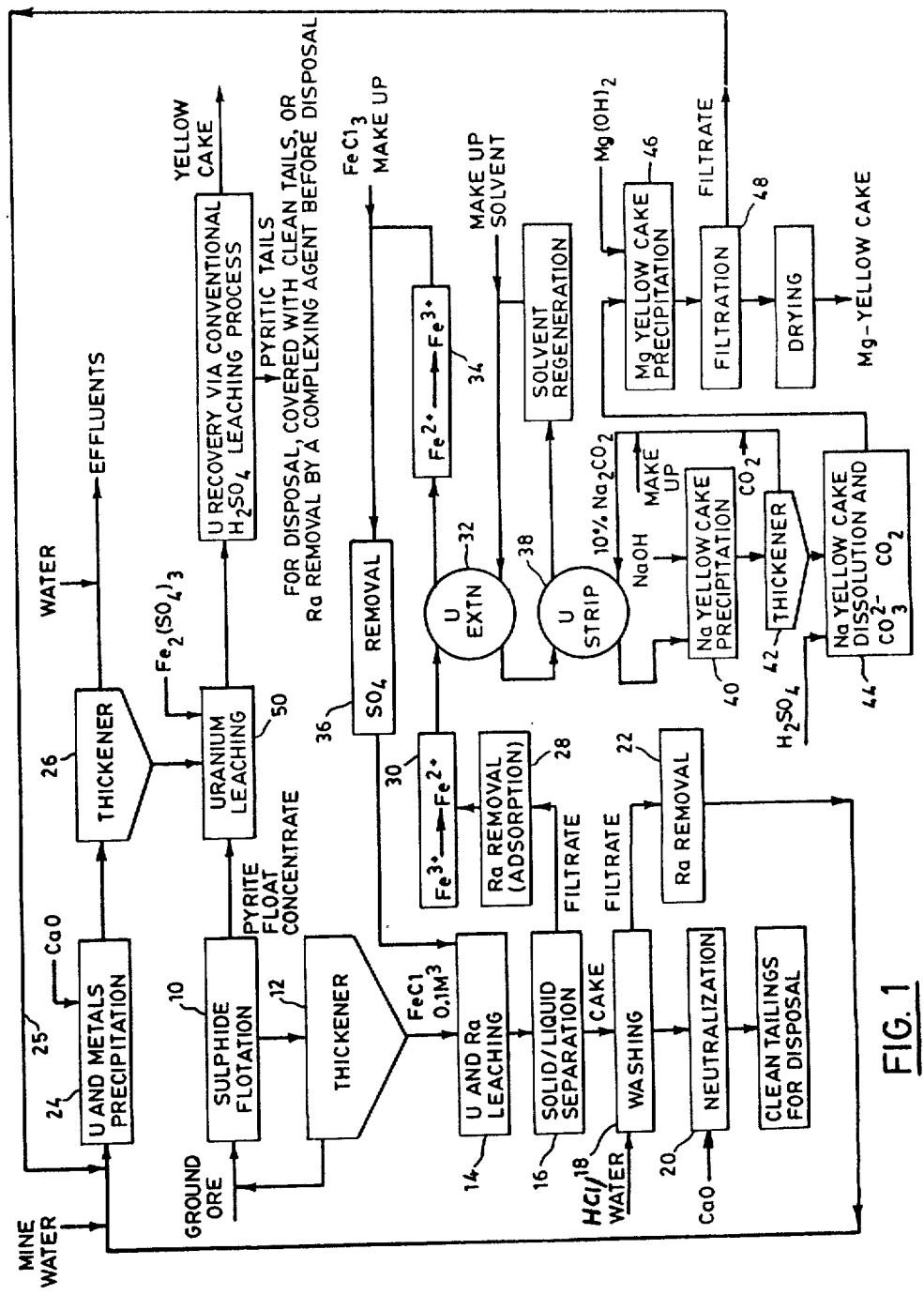
FIG. 1 is a flowsheet of a process of the invention.

The processes of the invention have been applied particularly to ore obtained from the Quirke Mill of Rio Algom Mines, Elliot Lake, Ontario, Canada. The ore typically contains 0.1% uranium mainly as uraninite $(U,Th)O_2$ and brannerite $(U,Th)Ti_2O_6$. A significant amount of pyrite, $FeS_2$, is present, typically in the order of 5–7% by mass, together with a substantially smaller amount of pyrrhotite (FeS), usually only a trace. The Colorado plateau materials contain substantially less amounts of sulphur compounds. The ore is subjected to the usual initial mechanical processes of crushing and screening with a final classification by a rake classifier, the classifier overflow that is passed onward for leaching comprising material with approximately 48% of the particles less than 75 microns (200 mesh).

This material was used in a series of test experiments to examine the efficiency of a number of different leachants, particularly solutions of certain metal salts, including aqueous ferric chloride. In these experiments 100 g of the dried solids were treated with 250 mL of the leach solution for one hour, at room temperature and at the natural pH. All leach solutions were of concentration 1.0M, except for potassium ferrocyanide which was of 0.5M concentration. The solids were maintained in suspension by a magnetic stirring bar in a covered beaker. The liquid/solid contact time for each experiment was about 1 hour and the operating temperatures were in the range of 22°14 25° C. Each suspension was then filtered on a Buchner funnel with Whatman 50 paper. The filtrate volume was measured and the wet cake was carefully transferred to a beaker, weighed, and dried at 110° C. for 24 to 30 hours. The dried cake was weighed and homogenised.

The filtrate and, in some cases, the cake, were analysed for radium, the analyses being performed using 25 mL wax-sealed sample jars filled with materials (solid or liquid) which had been stored for 30 days. This permitted the $^{226}Ra$ to decay for long enough to bring its daughter $^{214}Bi$ to an equilibrium level. The gamma ray spectra of the samples were recorded using an Ortec coaxial Ge(Li) detector and multichannel analyser tuned to the 609.4 keV photpeak of $^{214}Bi$. The sizes of the containers were such that the counting rate permitted measurements with ±5% precision over a 2000 second counting period.

The results are shown in Table 1 below on the basis of the radium concentration found in the filtrate (i.e. leachate). It may be noted that the sulphur-containing leaching agents all leached radium poorly, because of their tendency to oxidise to sulphates, giving rise to the insoluble radium sulphate ($RaSO_4$). Barium chloride is also a poor leachant; this is believed to be due to the presence of some sulphate initially from partial oxidation of pyrite, leading to the formation of $BaSO_4$, with which radium sulphate coprecipitates.

TABLE 1

| Results of tests on leaching with metal salts. | |
|---|---|
| Leachant | $^{226}Ra$ in the Extract (pCi/mL) |
| LiCl, $BaCl_2$, $Na_2S_2O_3$, $Na_2SO_3$, $Na_2CO_3$, $H_2O$ | 0–10 |
| NaCl, KCl, $NH_4Cl$, $MnCl_2$ $AlCl_3$, NaBr, $CH_3COONa$, $KNO_3$ | 10–20 |
| CsCl, $CaCl_2$, $K_4Fe(CN)_6$* | 20–30 |
| $FeCl_3$ | 67 |

*0.5 M solution

By far the most effective leachant is aqueous ferric chloride.

Further tests were then carried out with ferric chloride to determine the influence on the leaching process of each of the variables temperature, contact time, ferric chloride concentration of liquid to solids (L/S) ratio and to extend the results to uranium and radium leaching.

The mass of dried classifier overflow used in each test was 60 g. A hot water shaker-bath was used for the high temperature runs and the leaching was done in 250 mL Erlenmeyer flasks fitted with air condensers. Evaporation losses were negligible. The suspension was cooled immediately after leaching and filtered. The filter cake was removed in a beaker, repulped at room temperature with 1 to 1.5 times its mass of dilute HCl (pH 2.5), stirred for 5 minutes and filtered again. This was filtrate was added to the previous filtrate. The washed wet cake was weighed, dried at 110° C. for 24 to 30 hours, and the dried solids were weighed. The combined filtrate and the dried solids were analysed for radium and uranium.

The percent extraction was calculated as follows:

$$\% \text{ Extraction} = \frac{\text{Content in (Filtrate + Washings)}}{\text{Content in (Filtrate + Washings + Solids)}} \times 100 \quad (2)$$

Figure 2:
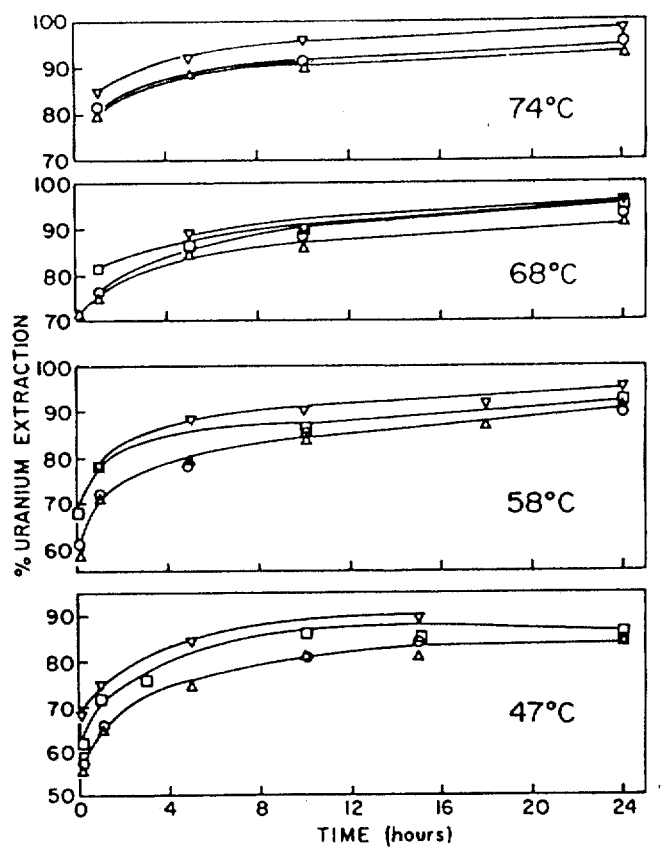
FIG. 2 comprises four graphs for four separate temperatures, each showing in a prior art process the dependence of uranium leaching on time and ferric chloride concentration, FIG. 3 comprises another four graphs, also for four separate temperatures, each showing in a prior art process the dependence of radium -226 leaching on time and ferric chloride concentration.

FIG. 2 gives the results for uranium leaching from the classifier overflow as a function of time at four temperatures and four concentrations of leaching agent at a constant L/S ratio of 2.5 mL/g. Leaching improves monotonically with contact time, temperature and ferric chloride concentration, with a maximum 97% extraction obtained with 1.0 M $FeCl_3$ at 75° C. for 24 hours. It may be noted that 60–70% of the final extraction occurs in the first 15 minutes, even at the lower temperatures. It will also be noted that both the rate of extraction and the final extraction value are relatively unaffected by the concentration of the ferric chloride solution, and that good results are obtained with concentrations as low as 0.10M and temperatures in the low range of 47°.C.–74° C., as contrasted with the respective values of 0.40M and 85° C. of Sawyer and Handley.

Figure 3:
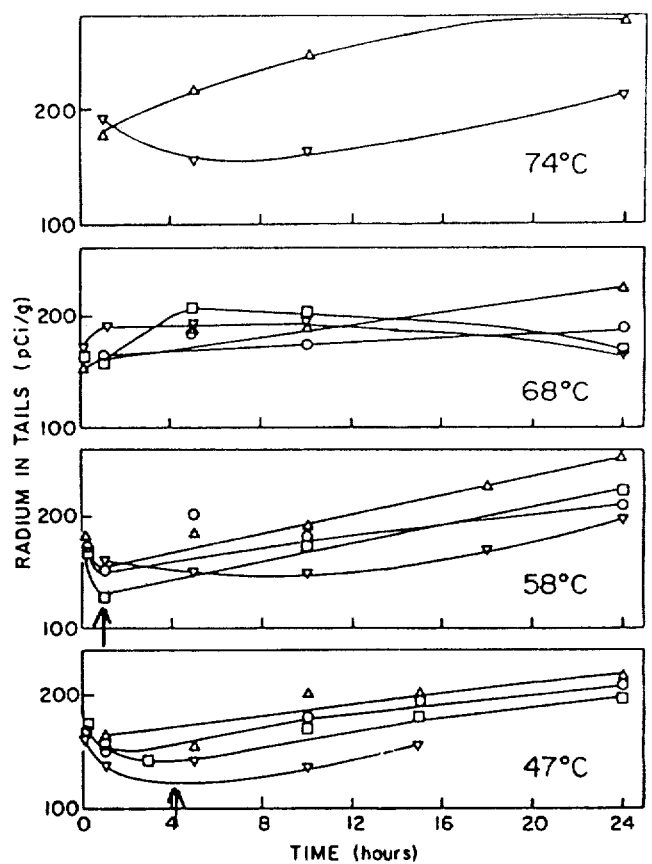

The kinetics of radium leaching under these conditions, as shown in FIG. 3, are therefore quite different from that of the corresponding uranium leaching. The ordinate of FIG. 3 is the radium content of the solid residue (tails) so that the minima seen in some of the curves represent maximum values of the percent radium extraction. The average $^{226}Ra$ in the feed material was 409 pCi/g and the highest extractions observed were only about 67% and these occured at 58° C. after only 1 hour and at 47° C. after about 4 hours, as indicated by arrows. Contrary to normal expectation, as the temperatures and contact times are increased, the trend of most of the data is towards reduced radium extraction. In FIG. 3 the radium content in the leach residues is plotted rather than the percent radium extraction so as to show that leach residues with acceptable low radium levels (approaching 25 pCi/g) are not obtained in any of these tests.

The following explanation for the data in FIG. 3 is suggested. As leaching commences, uranium and radium start to dissolve at approximately the same rate. However, the concentrations of $Ba^{2+}$ and $Pb^{2+}$ also begin to rise because of the dissolution of their respective minerals from the ore; sulphate ions are formed in solutions from the partial oxidation of pyrite ($FeS_2$) and pyrrhotite (FeS) by the ferric chloride. This leads to the formation of $BaSO_4$ and $PbSO_4$ with partial coprecipitation of the radium as the relatively insoluble sulphate. The rate of pyrite oxidation is known to be slow, and the above mechanism explains the slow reversal of the radium dissolution. Some sulphate ions were also initially present in the classifier overflow sample due to sulphates in the water added and due to the oxidation of sulphides in the preparatory grinding process. However, prewashing of the classifier overflow with distilled water just prior to ferric chloride leaching gave only a marginal improvement in radium extraction, and such prewashing in a commercial installation is economically not justifiable. This difficulty with radium dissolution apparently did not arise in the work of Sawyer and Handley, presumably because of the above-mentioned fact that the Colorado ores have much lower sulphide contents than those from Elliot Lake.

In accordance with this invention the finely ground ore material is subjected to a mechanical treatment step for the removal therefrom of the interfering sulphide minerals, or at least the reduction of the concentration thereof to an economically reasonable level, i.e. below 0.45% by weight. Because of the already finely divided state of the ore this mechanical separation step preferably is a mechanical froth flotation, indicated in the flow chart of FIG. 1 as sulphide flotation step 10. The material used for experiments in accordance with the invention was the overflow slurry from the rake classifier that normally is fed to a thickener and filters from which the usual leach feed is derived.

A 10 kg sample of the classifier overflow slurry was collected and its density was adjusted to give 66 wt% of solids. It was then ground in a ball mill for 1 hour, giving solids of 80% less than 46 microns (−325 mesh size). Flotation was carried out in a Denver flotation machine with potassium amyl xanthate at a rate of 0.04 kg/tonne solids and Dowfroth 250 (Trade Mark) at a rate of 0.025 kg/tonne of solids.

The sulphide float (pyrite concentrate) constituted 7% of the solid mass and contained substantially all of the sulphides and about 10% of the uraniuim and radium; the sulphide float tail therefore comprised about 93% of the solids fed, and contained about 90% of the uranium and radium. This sulphide float must subsequently be treated for removal of the uranium and radium values to acceptable residual levels, and the radium extraction will be made more difficult because of the high concentration of sulphide ion and consequent formation of sulphates. However, because of the greatly reduced quantity of material to be treated the use of more expensive leaching processes and leachants is economically justifiable. It is found that 98% of the uranium content can be leached with a dilute solution of ferric sulphate. The radium from this reduced mass may be removed with a chelating agent.

It will be seen that uranium extraction of 97% from the sulphide float tail is slightly better than the value of 94% from the classifier overflow. This may be due to the effect of the pyrite in the classifier overflow in forming $Fe^{2+}$ ions and lowering the solution e.m.f., which will be discussed below.

The radium extraction from the washed classifier overflow shows the same trends as were noted for the unwashed materials (see FIGS. 2 and 3), declining with time and not exceeding 73% in the best case. The radium extraction is significantly improved when the leaching is applied to the sulphide float tail. The extraction is best at the highest temperature where it improves with time to a level of 90% after 24 hours. However, it must be noted that it still is significantly less than the 97% extraction of uranium obtained under the same conditions.

FIG. 4 shows the comparison between the uranium and radium extractions from the washed classifier overflow, and from the sulphide float tail at two temperatures 74° C. and 47° C. which are the extremes of the range at which this invention has been tested. Uranium extraction is indicated by solid lines and radium extraction by broken lines respectively. The tests were performed at a fixed L/S dratio of 2.5 mL/g and with a leachant consisting of 0.01M $FeCl_3$ in 0.1 M HCl. The percentage extraction is plotted against time of contact.

Experiments to determine the effect of L/S ratio on the extractions were carried out at a temperature of 74° C., a contact time of 1 hour and using a leachant consisting of 0.1 M $FeCl_3$ in 0.1M HCl. These showed that uranium extraction is quite insensitive to L/S ratio, but the inhibiting effect of the sulphides in the classifier overflow are evident. The radium extraction, on the other hand, is improved as the L/S ratio is increased, particularly in the case of the washed classifier overflow. This is however believed to be due simply to a dilution effect which reduces the coprecipitation of radium sulphate with $BaSO_4$, $PbSO_4$, etc. The equilibria of the type $$Ba_x^{2+} + Ra_{1-x}^{2+} + SO_4^{2-} \rightleftharpoons Ba_xRa_{1-x}SO_4 \quad (3)$$

are moved to the left as the L/S ratio is increased.

The conceptual flowsheet of FIG. 1 will now be discussed in detail. It will be seen that the sulphide float tail is thickened at 12 as required and is then leached at 14 using an aqueous acidic 0.1M solution of ferric chloride in 0.1 M hydrochloric acid. The treated material is then subjected to a solid/liquid separation at 16 by means of any known suitable apparatus such as a drum filter. About 80% of the filtrate will be recovered while about 20% will remain with the cake. The solid cake material from 16 is washed at 18 with the requisite amount of an acid solution of hydrochloric acid so as to maintain a pH below 2.5 during washing and then neutralised (e.g. using lime) and the resulting tailings disposed of in conventional manner.

In an ideal leach circuit, all the ferric chloride could be recovered for re-use. In practice, however, a "bleed" of some of the leachant is needed to remove unwanted leached components such as heavy metals that would otherwise accumulate. The bleed may be provided by the separate "wash" of the leached solids at 18. If these solids are assumed to be wet with 20% of their weight of leachant (0.10M $FeCl_3$ with 0.93 g U per L), and the L/S ratio is 1.0 mL/g, it can be calculated that the bleed contains about 20% of the ferric chloride used, or 20 mol (3.2 kg) of ferric chloride per Mg of solids. The bleed stream also contains about 187 g of uranium per Mg of solids leached, which would justify a separate low level uranium recovery operation. Radium can be removed from the bleed liquid at 22 by barium radium sulphate coprecipitation or by adsorption on $MnO_2$. The liquid from the radium removal operation is therefore directed for the recovery therefrom of uranium at 24, where it can be mixed with two other streams containing small amounts of uranium, namely the mine water and water from a magnesium yellow cake filtration step 48 to be described below, this water being brought in one line 25.

The mixed streams are treated with lime to precipitate uranium as its hydroxide; the resultant metal hydroxide slurry is thickened at 26 and the resulting solids are fed to a uranium leaching stage 50 for the ultimate recovery of the uranium values. The clear overflow from the thickener 26 is diluted further if necessary with water to reduce the chloride ion level to a suitable value and is discarded.

Chloride levels in effluents for irrigation may not exceed 750 ppm in the Province of Ontario, Canada. The 0.10 M ferric chloride solution in 0.1M hydrochloric acid contains about 14500 ppm chloride, but if enough water is added to the low-level wash at 18 to give an L/S ratio of 3.0 mL/g, the discharged effluent chloride concentration would be reduced to an acceptable level of 750 ppm, due to the additional dilution obtained from mixing the pure water and the filtrate entering on line 25.

PROCESSING OF LEACHATE

The leach liquor from treatment of ore at an L/S ratio of 1.0 mL/g with 0.10M $FeCl_3$ and 0.10 M HCl will typically have a pH of 1.0, a uranium content of about 0.93 g/L and a radium content of about 300 pCi/mL. The three most obvious technical objectives in processing the leachate are the separate removal and concentration of (i) radium and (ii) uranium, and (iii) the recovery of the leachant for additional contact with ore, both for economic and environmental reasons.

Removal of other components that would otherwise build up in the leachant to an undesirable extent may also be required, as mentioned above.

The leachant from the solid/liquid separator 16 is subjected to a radium removal step at 28, and the remaining ferric ion is subjected to a reduction step at 30 to facilitate the subsequent uranium extraction at 32. The recovered leach liquid is now re-oxidised to recover the necessary ferric chloride component at 34 and make-up $FeCl_3$ is added as required. The made-up leach liquid is subjected to a sulphate removal at 36, in view of the deleterious effect of this ion on the leach step at 14, and the process repeats.

Owing to its highly corrosive nature, particularly at higher concentrations, the concentration of the ferric chloride leachant should be kept as low as possible and a practical lower limit is found to be about 0.1M. The tests show that there is not sufficient advantage to increasing the concentration above 0.2M to be economically justifiable, and concentrations below 0.05M also are not economical. The leachate must be acidic in character with a pH below 1.0, the necessary reduction preferably being produced by the addition as necessary of hydrochloric acid. As indicated, with a ferric chloride concentration of 0.1M the same concentration of hydrochloric acid is also suitable. For the preferred range of 0.05 to 0.2M ferric chloride the hydrochloric acid will usually also vary from 0.05M to 0.2M. The presence of acid conditions of the indicated level is necessary to inhibit the hydrolysis of the ferric chloride and avoid the formation of colloidal hydrated ferric oxides. These colloidal hydroxides can absorb a part of the dissolved radium, resulting in higher radium levels in the leach residues or tailings.

The process of the invention permits this recycling and consequent recovery of the ferric chloride for re-use, as contrasted with the earlier proposal of Sawyer and Handley. The earlier proposal called for precipitation of the iron as hydroxide with redissolution in fresh HCl, resulting in heavy discharges of chloride ions and extra costs for hydrochloric acid. Moreover, the precipitation of the iron resulted in a floccular precipitate that was difficult and expensive to handle, in particular very difficult to filter for subsequent processing.

REMOVAL OF RADIUM FROM LEACHANT

A satisfactory sub-process for this is adsorption by manganese dioxide. A finely divided $MnO_2$ was prepared by first precipitating the hydroxide from manganese chloride, filtering, and drying in an oven at 110° C. A sample of 100 mL of ferric chloride leachant (0.10M $FeCl_3$, 0.10M HCl, 83.4 pCi Ra/mL) was stirred for one hour at room temperature with 10 g of the manganese dioxide, then the solids were filtered off and washed. The radium content of the filtrate and washings corresponded to 4.8 pCi per mL of initial leachate, i.e. 94% of the radium in the initial solution had been retained by the manganese dioxide.

Conventional precipitation of radium as barium radium sulphate, as suggested by Sawyer and Handley, is to be avoided in the recycle streams in the processes of the invention because the added sulphate ions would interfere with radium leaching by the recycled ferric chloride.

REMOVAL OF URANIUM FROM LEACHANT

This can be effected by a modified form of the DAPEX process as described in "The Extractive Metallurgy of Uranium" by R. C. Merritt published 1971 by the Colorado School of Mines Research Institute at pages 204-205, whereby liquid-liquid extraction is used to remove uranium from sulphate leach liquors. The organic extractant is a solution of 5% by volume di-2-ethyl-hexyl-phosphoric acid (D2EHPA) and 2.5% tributyl phosphate (TBP) in kerosene. The aqueous phase must first be treated (as at 30) with a reducing agent to convert all the ferric iron to ferrous, thereby preventing the uptake of iron in the organic phase. Sulphur dioxide was used as a reducing agent in the present processes, but in a practical circuit, the sulphate levels must be minimised so the use of sulphur dioxide is possible only if the $SO_4^{2-}$ can be effectively removed from the solution before its recycle. The uranium-loaded organic phase is stripped at 38 with a 10% aqueous solution of sodium carbonate, giving a uranyl carbonate solution, from which uranium may be precipitated at 40 as a sodium yellow cake by the addition of sodium hydroxide. The sodium yellow cake is relatively difficult to filter and a magnesium yellow cake is preferred instead. However, the precipitation of magnesium yellow cake from the carbonate strip solution will inevitably be accompanied by the simultaneous precipitation of the insoluble magnesium carbonate. For this reason, the sodium yellow cake slurry is first thickened at 42 and the clear overflow is recycled to strip stage 38 for further stripping, after treatment with carbon dioxide and adding the make-up sodium carbonate. The densified slurry from thickener 42 is treated with sulphuric acid at 44 to dissolve the sodium yellow cake; the acid also decomposes the carbonate present and carbon dioxide is evolved in this operation. This acid solution is now treated with magnesia at 46 and the magnesium yellow cake is precipitated. This yellow cake is filtered at 48, and sent for drying. The filtrate from 48 containing some unprecipitated uranium is directed to stage 24 via 25 as described above to be treated in the low level uranium recovery step 24, where it is mixed with the washings of step 18 and the mine water.

Extraction and stripping results are summarised in Table 2.

TABLE 2

Solvent Extraction and Stripping of Uranium (a) Extraction

Aqueous feed approximately 0.10 M $FeCl_2$, pH 0.90, 0.362 g U/L.
Solvent: 5 vol. % D2EHPA, 2.5 vol. % TBP in odorless kerosene.
Volume of aqueous feed used in each test: 40 mL.

| Test No. | E1 | E2 | E3 |
|---|---|---|---|
| Solvent vol. (mL) | 2.5 | 5.0 | 10.0 |
| Aqueous/org. volume ratio | 16 | 8 | 4 |
| U in extract (ppm) | 5300 | 2900 | 1455 |
| U in raffinate (ppm) | 33.2 | 3.3 | 0.7 |
| % U extraction: | 91.0 | 99.1 | 99.8 |

(b) Stripping

U concentration in loaded organic solvent: 955 ppm.
Strip solution: 10 mass % aqueous solution of $Na_2CO_3$
Volume of loaded organic phase used in each test: 20 mL.

| Test No. | S1 | S2 | S3 |
|---|---|---|---|
| Strip Soln. (mL) | 2.5 | 5.0 | 10.3 |
| Org./aqueous volume ratio | 8 | 4 | 2 |
| U in loaded aq. (ppm) | 900 | 4000 | 1795 |
| U in stripped organic (ppm) | 890 | 31 | 23.9 |

TABLE 2-continued

Solvent Extraction and Stripping of Uranium

| % U stripping: | 11.1 | 99.7 | 97.4 |
|---|---|---|---|

It may be noted that the uranium concentration can be increased substantially, both in the extraction and stripping operations, by using small and large organic-/aqueous phase ratios respectively.

The pyrite concentrate obtained from the sulphide flotation step 10 contains about 10% each of the uranium and radium initially present in the ground ore. This mass constitutes nearly 7 wt% of the ground ore fed to the flotation cell at 10. The thickened slurry from 24, containing uranium in the hydroxide form, is mixed with this pyrite concentrate and the solids are leached with a dilute solution of ferric sulphate at 50. After leaching the leach slurry may be subjected to the same treatment as for a conventional sulphuric acid leaching process for the recovery of the dissolved uranium. No radium is leached in this operation. The leach residue from this uranium leaching step is essentially the sulphides (pyrite) present in the ore. It may be further treated with a suitable complexing agent to remove the radium present in it, or it may be stored separately, or it may be disposed of under a massive cover of the non-sulphidic clean tailings obtained at 20.

OTHER TREATMENTS OF LEACHANT PRIOR TO RE-USE

The raffinate from the uranium extraction process at 32 is an acid ferrous chloride solution and an oxidation step is required, such as air with oxidising bacteria.

A test made on the repeated contact of fresh solids by a single sample of ferric chloride leachant solution shows the need for the sulphate removal step 32. Initially, 375 mL of a leach solution of 0.10M $FeCl_3$ and 0.10M HCl was contacted with 150 g of sulphide float tail, for 24 hours at 74° C. After 5 hours of contact, sodium chlorate was added in the ratio 0.1 g per 100 g solids. The filtrate from this contact was contacted with 125 g of fresh sulphide float tail, under the same conditions. The procedure was repeated four more times using 100, 80, 70 and 60 g of fresh solid feeds. The use of these masses ensured that L/S ratio remained the same at 2.5 mL/g in each contact, making due allowance for the retention of some of the leach liquor on the filter cake. Before each leach stage, a very small amount of $NaClO_3$ was added to the leach liquor to maintain the initial e.m.f. at 650 mV. The results indicate that, while uranium extraction remains in excess of 90% even after six passes of the solution, the radium extraction decreases rapidly. The occurrence of negative percent radium extractions in passes 4, 5 and 6 denotes that radium is depositing from solution onto the solids in these cases. The conclusion is that sulphate ion build-up in the solution is causing this deposition and it must be removed.

EFFECT OF OXIDANT ON THE LEACHANT

The role of ferric ion in uranium leaching is well-known and has been noted in equation (1) above. During the leaching stage the ferrous ion concentration must be kept as low as possible and it is common practice to add an oxidant such as sodium chlorate to the leach for this purpose. It is found that the effect of sodium chlorate on uranium extraction is beneficial, even in the case of sulphide float tails. However, the effect of chlorate is sharply negative as far as radium extraction from classifier overflow is concerned, due to enhanced formation of sulphate from the pyrite.

The e.m.f. of the leach solution (versus standard calomel electrode) is a measure of oxidising power, and depends mainly on the ratio of $[Fe^{3+}]/[Fe^{2+}]$ in the leach solution.

Figure 5:
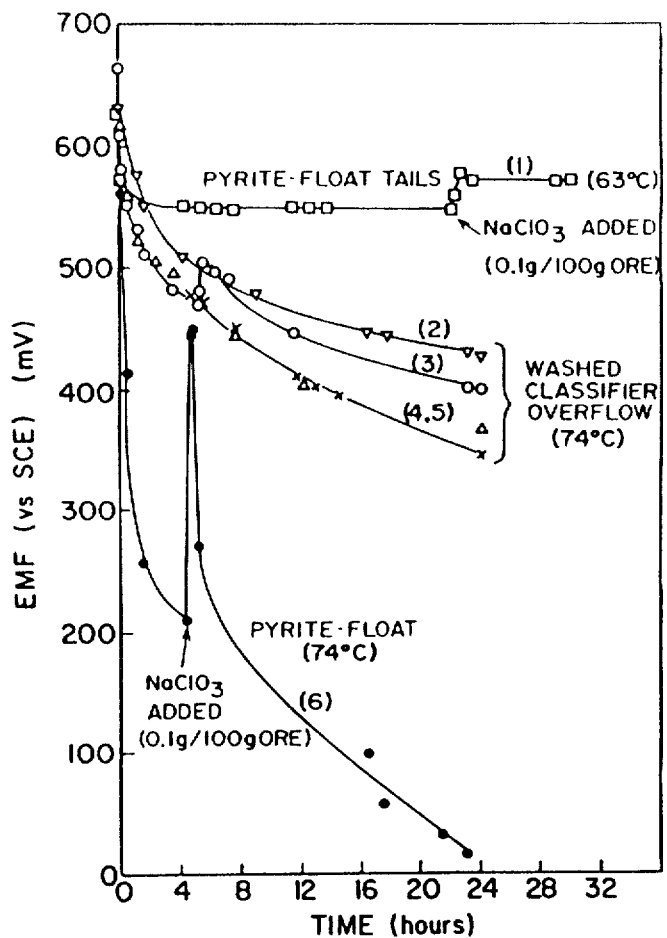
FIG. 5 is a graph showing the changes in e.m.f. during leaching of feed materials both for prior art processes and processes in accordance with the invention to permit comparison thereof.

Curves 2 through 5 in FIG. 5 refer to leaches of washed classifier overflow and show a gradual decline, indicating reduction of $Fe^{3+}$ to $Fe^{2+}$. The decline is reversed (curve 3) when sodium chlorate is added, but resumes eventually. Sulphide float tails (curve 1) show only a small decline, but again, an improvement in e.m.f. is given by sodium chlorate addition. The sulphide float concentrate leach (curve 6) shows the greatest decline in e.m.f., as may be expected from the high pyrite levels preset in the solid phase. Chlorate addition has a pronounced but short-lived beneficial effect. The indication is that effective uranium extraction from the concentrate can only be achieved with substantial additions of oxidant.

A leach with 0.1M $FeCl_3$ and 0.1M HCl for 1 hour at 74° C. gave 74% uranium extraction with the initial addition of 4 g $NaClO_3$ per 100 g of solids. Radium extraction under these conditions was negligible, due to excessive sulphate formation.

Figure 6:
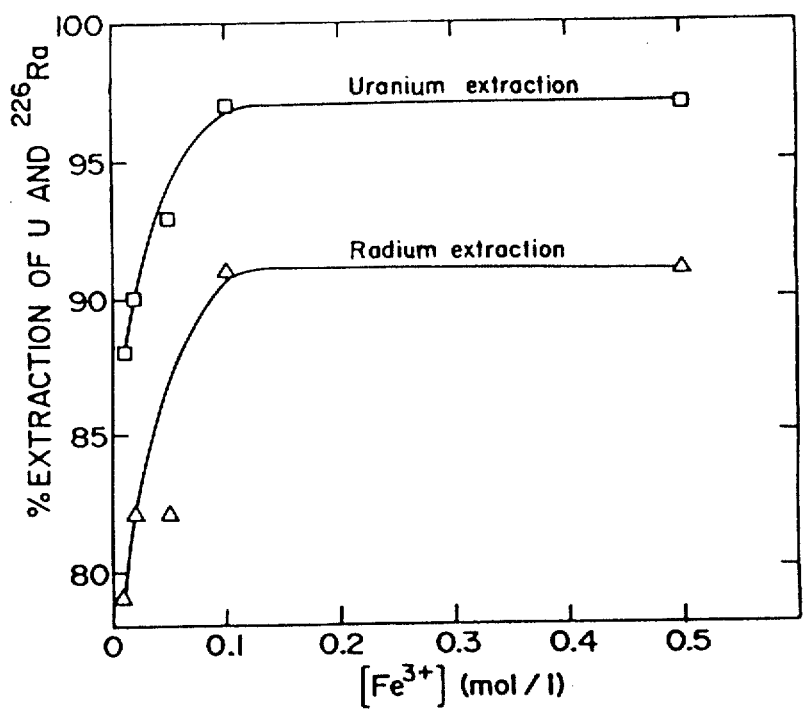
FIG. 6 is a graph showing the effect of changes in ferric ion concentration on the extraction of uranium and radium in a process of the invention.

FIG. 6 shows how the extractions of uranium and radium are affected by the concentration of ferric ion in the initial leachant. The leachant has a pH of 1.0 and includes 0.1 g $NaClO_3$ per 100 g as oxidant. The L/S ratio is 2.5 mL/g and the temperature employed is 74° C. The curve for uranium extraction resembles an adsorption isotherm, suggesting that $Fe^{3+}$ ions undergo adsorption before oxidising U(IV) to U(VI) at the mineral surface. The curves show that ferric chloride concentrations above 0.2M are unnecessary with the processes of the invention.

RELATIONSHIP BETWEEN RESIDUAL U AND RA CONCENTRATIONS

As noted above the concept of secular equilibrium leads to a constant ratio between uranium and radium concentrations in ores. If the percentage extractions of uranium and radium in a leaching process were the same, this ratio of concentrations would remain in the solid residue.

In the case of sulphide float tails, radium is extracted almost, but not quite as effectively as uranium. If the residual concentrations of radium are plotted against the corresponding residual uranium concentrations for a variety of conditions (temperature, time, leachant concentration), it is found that the data can be fitted quite well by a straight line plot. Regression analysis of the data points gives the following relationship:

Ra assay in leach residue (pCi/g) = $20.7 + 0.34 \times U$
assay in leach resudue (ug/g)    (4)

The slope (0.34) of the experimental plot is the same as that predicted from the half-lives of $^{238}U$ and $^{226}Ra$ assuming (i) initial secular equilibrium and (ii) that the two elements are leached to an equal extent, but this predicted line passes through the origin. This calculation also indicates that 20.7 pCi/g of $^{226}Ra$ would remain in the leach residue even after all the uranium is leached from the ore. This level of 20.7 pCi/g is determined by the type of solids treated, the reagents used for leaching and the mechanisms by which the radium is retained on the solids.

We claim:

1. A process for the extraction of both uranium and radium from difficultly-leachable low grade uranium ores in the presence of an an interfering sulphate ion resulting from the presence of sulphide therein by use of an aqueous ferric chloride leachant including the steps of:
   (a) mechanically treating the finely ground ore for the removal of sulphide therefrom;
   (b) leaching the mechanically treated finely ground ore with aqueous acidic ferric chloride solution in a concentration from 0.05M to 0.2M for the removal of uranium and radium therefrom to result in a liquid ferric chloride leachate containing radium and uranium and a wet cake containing retained ferric chloride with uranium and radium dissolved therein;
   (c) treating the ferric chloride leachate to separate the uranium and radium therefrom;
   (d) separately treating the wet cake for removal of retained ferric chloride and the dissolved uranium and radium therefrom; and
   (e) recycling the ferric chloride leachate from step (c) for the leaching of more of the mechanically treated finely ground ore.

2. A process as claimed in claim 1, wherein the said acidic solution is in hydrochloric acid of concentration 0.05M to 0.2M and equal to the concentration of the ferric chloride.

3. A process as claimed in claim 1 or 2, wherein the sulphide is in the form of the minerals pyrite and pyrrhotite and the mechanical treatment consists of flotation removal thereof.

4. A process as claimed in claim 1 or 2, wherein the acidic ferric chloride leachant solution is used in amounts to give an effective liquid to solid ratio of from 1 to 2.5 mL/g of ore.

5. A process as claimed in claim 1 or 2, wherein the said wet cake is washed separately with an acidic solution of hydrochloric acid so as to maintain a pH about 2.5 during washing.

6. A process as claimed in claim 1 or 2, wherein the radium is separated by adsorption thereof by an adsorbent.

7. A process as claimed in claim 1 or 2, wherein the uranium is separated by liquid-liquid extraction with an organic solvent.

8. A process as claimed in claim 1 or 2, wherein the ferric chloride leachate is treated to remove radium, subsequently is reduced to convert ferric ion to ferrous ion, the uranium therein is removed by liquid-liquid extaction with an organic solvent, and the ferrous chloride solution is then oxidised to convert the ferrous ion to ferric ion for reuse thereof.

9. A process as claimed in claim 1 or 2, wherein the ferric chloride leachate is treated to remove radium, subsequently is reduced to convert ferric ion to ferrous ion, the uranium therein is removed by liquid-liquid extraction with an organic solvent, and the ferrous chloride solution is then oxidised to convert the ferrous ion to ferric ion for reuse thereof, and including the step of removing sulphate from the ferric chloride solution subsequent to its oxidation and prior to its reuse as a leaching agent.

10. A process as claimed in claim 1 or 2, wherein the said ferric chloride leachate containing radium and uranium constitutes about 80% the original ferric chloride leach solution and is recycled for releaching, the remainder of the original ferric chloride leach solution is retained by the wet cake, the wet cake is washed to remove the remainder of the ferric chloride leach solution and the dissolved uranium and radium therefrom, and the washing liquid from the wash of the wet cake constitutes a bleed stream for removal of unwanted leached components.

* * * * *